United States Patent [19]
Ruschau

[11] Patent Number: 5,633,038
[45] Date of Patent: May 27, 1997

[54] METHOD OF TREATMENT OF PIPELINES AND OTHER STEEL SURFACES FOR IMPROVED COATING ADHESION

[75] Inventor: Gregory R. Ruschau, Garland, Tex.

[73] Assignee: Atlantic Richfield Company, Los Angeles, Calif.

[21] Appl. No.: 328,729

[22] Filed: Oct. 25, 1994

[51] Int. Cl.$^6$ .................................................. B05D 7/22
[52] U.S. Cl. .......................... 427/239; 427/327; 427/409; 427/410
[58] Field of Search .................... 427/239, 327, 427/409, 410, 444

*Primary Examiner*—Bernard Pianalto
*Attorney, Agent, or Firm*—Michael E. Martin

[57] ABSTRACT

Carbon steel surfaces, particularly inside wall surfaces of steel pipelines, are treated with an organosilane coupling agent to improve the adhesion of epoxy, vinyl ester and similar polymer-type protective coatings to the surface. The organosilane coupling agent is applied to a cleaned steel surface in an aqueous and/or alcohol solution, the surface is dried to allow the organosilane to cure and the protective coating is then applied to the surface. Steel pipelines are coated in situ by cleaning the interior of the pipeline with hydrochloric acid, fresh water and a passivation agent such as phosphoric acid followed by pumping a slug of the organosilane coupling agent, in solution, through the pipeline between spaced apart pigs. The coupling agent is dried and a polymer coating is then applied by pumping a slug of the coating through the pipeline, also between two spaced apart pigs.

18 Claims, 1 Drawing Sheet

METHOD OF TREATMENT OF PIPELINES AND OTHER STEEL SURFACES FOR IMPROVED COATING ADHESION

FIELD OF THE INVENTION

The present invention pertains to a method for treating steel surfaces, particularly the interior surfaces of steel pipelines, with coupling agents which improve protective coating adhesion.

BACKGROUND OF THE INVENTION

Carbon steel structures, including steel pipelines, are often provided with protective coatings to prevent corrosion. Most protective coatings applied to carbon or similar low alloy steels form a physical barrier between the corrosive environment and the steel surface. The performance of coatings for steel surfaces varies greatly due to the chemistry of the different resins used for coating materials, variations in type of pigment, coating thickness and surface preparation of the steel substrate prior to the coating process. A common failure mode of polymer type coatings, in particular, is the loss of adhesion between the steel surface and the coating itself. Often, the adhesion loss is so complete that the coating will disbond entirely from the steel surface in the form of blisters. Of course, once a blister has formed, water and gas can usually penetrate the coating, gather behind the blister and cause substantial corrosion to the steel.

Certain coatings are applied to steel surfaces over so-called primer coats, at least some of which have better adhesion to steel than conventional polymer type topcoats. The primer coat is intended to provide a more favorable substrate surface to which the top coat or primary coating can bond. However, primer coats have the same disadvantages as most conventional polymer coatings, namely the relatively weak adhesion between the steel and the primer coat layer.

The bonding of polymer-type coatings, including primer coats, to a steel surface is primarily driven by weak Van der Waals forces and limited dipolar attraction from some of the radical groups on the polymer backbone. Even freshly cleaned steel has a thin oxide layer on its surface wherein a polymer type coating must first wet the steel surface completely, then dry and/or crosslink while maintaining good contact with the steel surface. Although there is some mechanical bonding between polymer coatings and steel surfaces, depending on the steel surface profile, when a force stronger than these bonding forces acts on the interface, the coating can fracture, delaminate or, most commonly, break the interfacial bond in the form of a blister.

The conventional solution to preventing blistering of polymer coatings to steel surfaces has been to increase the strength of the bond by increasing the bonding area. This is commonly carried out by mechanical abrasion of the steel surface such as sand blasting to increase the bonding surface area. Certainly, surface cleanliness is important and removal of all contaminants such as dirt, oil, and previous corrosion from the steel surface must be accomplished to improve adhesion between polymer coatings and carbon steel surfaces, in particular.

One environment wherein a high degree of surface cleanliness is difficult to achieve is in situ coating of steel pipelines used in the oil and gas industry, for example. Efforts to coat the interior surfaces of steel pipelines which have been conducting hydrocarbon materials, such as crude oil and refined petroleum products, have had only moderate success. The cleaning process for a pipeline which has been in service for any period of time requires removal of all of the pipeline transport product from the line, removal of residues such as paraffins, asphaltenes, and waxes from the pipeline surfaces and removal of any previous corrosion product (rust) from the steel surface prior to application of the coating. Complete removal of all of these materials is time consuming and difficult to accomplish. Moreover, preparation of the steel surface to increase the bonding area, such as by sandblasting, is also difficult to accomplish and time consuming when being carried out in situ on existing fluid transport pipelines.

Accordingly, there has been a strong need to develop improved coating adhesion to steel surfaces, including, in particular, the interior surfaces of new and existing steel pipelines used for transporting fluids in the oil and gas industry. It is to these ends that the present invention has been developed.

SUMMARY OF THE INVENTION

The present invention provides a method for treating steel surfaces to improve the adhesion of protective coatings to such surfaces.

In accordance with one important aspect of the invention, a method is provided for treating the interior surfaces of a steel pipeline, in situ, prior to applying a protective coating to the pipeline.

In accordance with another important aspect of the invention, a method for treating steel surfaces, including the interior surfaces of steel pipelines, is provided wherein a unique coupling agent is deposited on the steel surface, preferably after cleaning the surface, and prior to application of a protective coating, particularly a polymer-type coating.

In accordance with yet a further aspect of the present invention, a method is provided for treating steel surfaces to improve the adhesion of protective coatings, particularly polymer type coatings, wherein an organosilane coupling agent is applied to the steel surface and allowed to "dry" to vaporize the coupling agent carrier fluid thereby leaving a surface layer of coupling agent on the steel surface. The surface thus contains a monolayer of coupling agent which may then have a protective coating applied thereto immediately.

The present invention still further contemplates a method for treating the interior surfaces of a steel pipeline, in situ, to prepare the pipeline for in situ coating wherein a coupling agent in accordance with the invention is applied as part of a final flushing operation during the pipeline cleaning process to cover the cleaned steel surface with a layer of coupling agent which is of a type particularly adapted to improve the adhesion of polymer type coatings, including polyamines, polyamides, epoxy phenolics and epoxy novolacs. The treatment process in accordance with the invention also contemplates improving the adhesion of vinyl ester type coatings to steel surfaces, including the interior surfaces of pipelines used in the oil and gas industry.

The treatment method of the invention is particularly advantageous for treating the interior surfaces of steel pipelines using a spaced-apart pig and fluid slug transport and coating method. Moreover, the coupling agent used in the method of the invention is readily disbursable in carrier fluids such as water and conventional organic solvents such as methanol. Use of a coupling agent in accordance with the method of the invention is attractive since the chemical type surface cleaning process normally required for in situ pipeline cleaning and coating operations results in a relatively poor steel surface profile as compared with mechanical cleaning methods such as sandblasting. Still further, the chemical treatment method of the invention is particularly advantageous for use in improving the adhesion of coatings which are used for in situ pipeline coating processes, which coatings have requisite high solids content and high viscosity, both being properties which tend to reduce coating adhesion performance.

Those skilled in the art will further appreciate the above-mentioned features and advantages of the invention together with other superior aspects thereof upon reading the detailed description which follows in conjunction with the drawing.

DESCRIPTION OF PREFERRED EMBODIMENTS

Figures 1, 2:
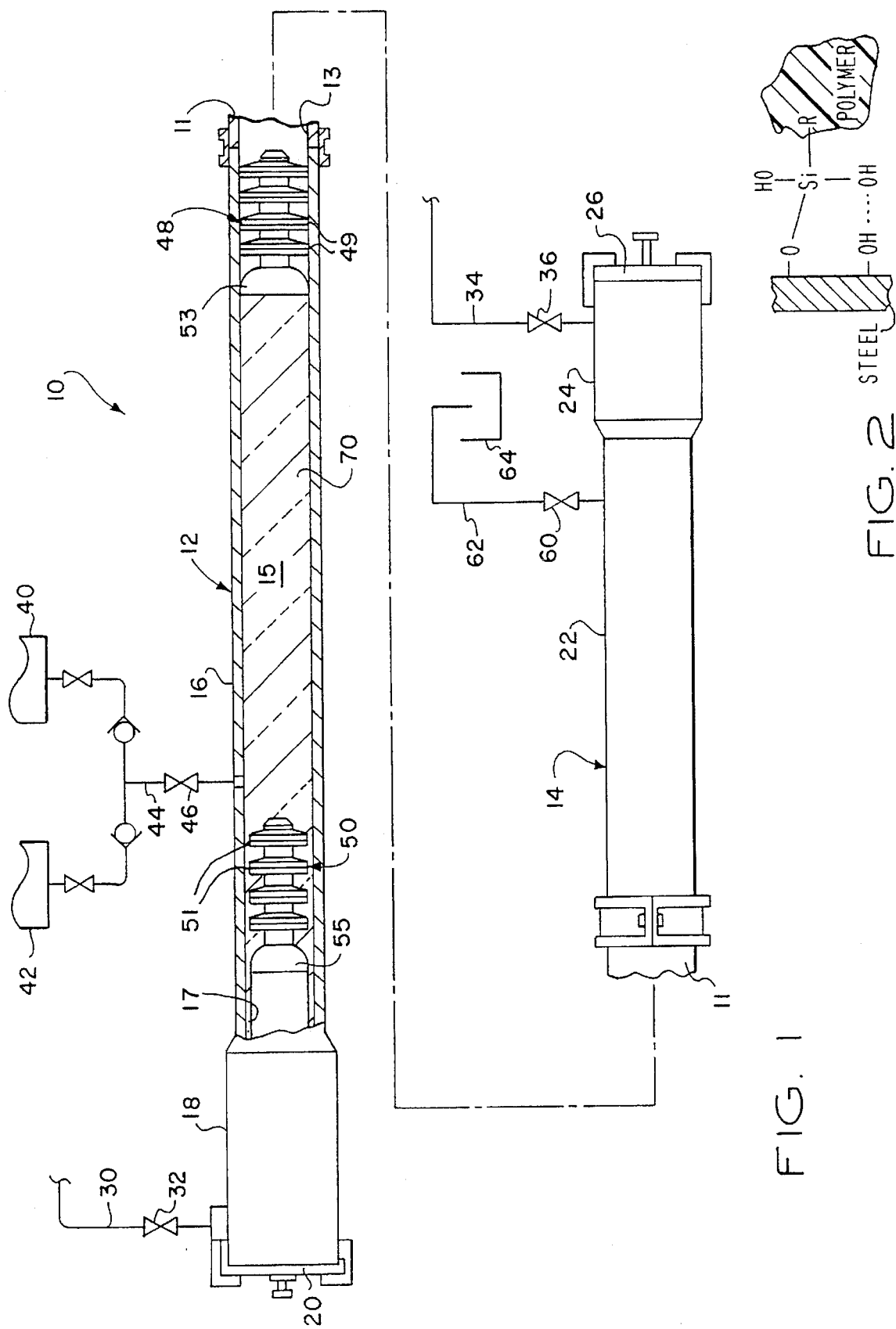
FIG. 1 is a schematic diagram of a fluid transmission pipeline and illustrating a method for applying a coating adhesion coupling agent and a protective coating to the interior surfaces of the pipeline.
FIG. 2 is a diagram depicting the coupling agent bonding characteristics in accordance with the invention.

The petroleum industry utilizes virtually uncountable miles of pipeline of various sizes for transporting crude oil, refined products, natural gas, produced water including salt water and brine, various kinds of corrosive chemicals, abrasives and slurries. Accordingly, pipeline maintenance is a significant cost factor for petroleum production and refining operations and petrochemical manufacturing. Many uncoated pipes are subject to corrosion almost immediately after being placed in service. Pipelines which have received an initial coating on their interior surfaces may, from time-to-time, be subject to maintenance due to failure or wearing away of the coating and the eventual corrosion that results due to exposure of the uncoated steel surfaces to the fluids being transported through the pipeline.

An in situ coating process has been developed wherein, after the pipeline is cleaned, a slug of viscous fluid coating material is loaded into the line between two pipeline pigs and the slug of coating material, together with the pigs, is traversed through the line wherein the coating material covers the pipe interior wall surface by extrusion of a thin film of coating as the slug passes through the line. The coating material is typically an epoxy resin or a similar polymer suitable for use as a protective coating against the fluids which are to be transported through the line. However, in preparing steel pipelines for in situ coating processes, suitable preparation of the pipe inner wall surface for receiving the coating is difficult to accomplish. Thorough cleaning of the surface is relatively complicated and requires several operations to flush the section of line which is to be covered with the corrosion resistant coating. Since mechanical treatment of the pipe wall surface is difficult to accomplish for in situ coating operations, a chemical treatment of the surface is preferred as a means for enhancing coating adhesion.

The present invention contemplates a method for chemical treatment of steel and similar metals to improve coating adhesion, particularly coatings of polymer materials such as epoxies and vinyl esters. In particular, the present invention contemplates the use of a coupling agent for increasing the adhesion of polymer type coatings to steel surfaces comprising organosilanes having at least two functionalities, one of the functionalities comprising a hydrolyzable group providing a bond between the steel surface and silicon in the organosilane, the other functionality comprising a non-hydrolyzable radical providing a bond with a polymeric coating. The hydrolyzable group consists of one of an alkoxy, acyloxy, amine and chlorine. The most common alkoxy groups are methoxy and ethoxy which give methanol and ethanol as by-products during coupling reactions. Since chlorosilanes generate hydrogen chloride as a by-product during coupling reactions, they may, generally, be utilized less than alkoxy silanes.

FIG. 2 is a diagram depicting how an organosilane coupling agent may bond a polymer such as an epoxy or vinyl ester composition to a steel substrate surface in accordance with the method of the invention. Organosilanes have been used as bonding agents between polyester resins and glass fiber inorganic fillers. Typically, the glass fiber is wetted with the organosilane composition in a solution of water or a suitable solvent, the wetted material is allowed to dry and then mixed into or otherwise exposed to the binding resin.

The present invention contemplates the application of an organosilane coupling agent to a steel surface, particularly a carbon or low alloy steel of the type used in pipe-lines in the petroleum industry, off-shore structures, pressure vessels and related structures which are subject to corrosion and poor adhesion of polymer-type coatings, in particular. Deposition of the organosilane may be carried out from combined aqueous-alcohol solutions, aqueous solutions, alcohol solutions or solutions of tetrahydrofuran or toluene. For example, a ninety-five percent ethanol-five percent water solution may be used wherein the organosilane is added to yield a two percent final concentration of organosilane in the solution. Suitable time should be allowed for hydrolysis and silanol formation. Large objects such as steel plates or the like may be dipped into the solution, agitated gently and removed after a suitable time period, say one to two minutes. These articles may then be rinsed free of excess materials by dipping them briefly in ethanol. Curing of the silane layer may be carried out in a short period of time say five to ten minutes at elevated temperatures, i.e., 110° C. or for longer periods at room temperature. The above-mentioned solutions as well as two percent aqueous solutions of organosilane compositions may be applied to the substrate to be treated wherein the solution is either sprayed onto the substrate or employed as a dip bath. Again, curing may be conducted at temperatures of 110° C. to 120° C. for a relatively short period of time, say ten to thirty minutes, or a longer period of time at room temperature.

Certain organosilanes may also be applied as a primer coat comprising alcohol and an organosilane concentration of as high as fifty percent in the alcohol. Typically, one to three molar equivalents of water are added to the solution and the solution is then diluted to ten percent concentration of organosilane with a higher boiling point polar solvent. Steel articles to be coated with a primer coat of such coupling agent may be dipped or sprayed.

The present invention contemplates the effective "dipping" of the internal walls of steel pipelines by transporting a slug of the organosilane solution through the line to deposit the "primer" layer on the steel surface. Low carbon steel such as API 5LB or API 5LX52 grades may be coated with organosilane coupling agents to improve the adhesive bond between the steel and a polymer coating such as an epoxy or vinyl ester. Moreover, steel plates, for example, (or other structures which are accessible for conventional surface preparation operations) may be prepared for application of an organosilane coupling agent by scrubbing the surface to be coated with a caustic detergent solution, preferably using steel wool as the scrubbing element. The surface is then rinsed thoroughly with deionized water. The steel substrate is then soaked for thirty minutes in a twenty percent hydrochloric acid solution and rinsed in water, then soaked for five minutes in a five percent phosphoric acid solution and rinsed in water, followed by rinsing in a 0.50 percent wet blast inhibitor solution and rinsed in MEK (methyl ethyl ketone) and then allowed to dry. This surface preparation should result in a so-called blast surface profile (roughness) of about 0.50 mils as compared with 2.0 mils for normal sandblasting operations. The pH of the surface should be greater than about six.

An appropriate organosilane composition suitable for use in enhancing the adhesion of epoxy and vinyl ester-type coatings is then applied using one of the deposition methods described above. The organosilane coupling agent may comprise 3-aminopropyl-triethoxysilane of a type sold by Huls America, Inc. as their product name A0750. Alternatively, an organosilane comprising Glycidoxypropyltrimethoxysilane may be used as the coupling agent. This material is also available from Huls America, Inc. as their product designation G6720. These coupling agents are prepared in a solution of the type described above, applied to the steel surface, and allowed to dry, preferably in accordance with the methods described above.

A suitable polymer coating, selected from a group consisting of polyamines, epoxies including polyamides, epoxy phenolics and epoxy novlaks and vinyl esters may then be applied to the steel over the coupling agent. Accordingly, the hydroxyl "head" of the coupling agent which has bonded itself to the steel surface, including any oxide layer formed thereon, via hydrogen bonding, leaves the organic "tail" of the coupling agent free to become entangled with the polymeric chains of the epoxy resin, thus becoming part of the resin itself. The hydrogen bond at the substrate surface is physically stronger than the intramolecular bonding within the resin itself. One suitable epoxy coating material is known as Plasite 9051 available from Wisconsin Protective Coatings of Green Bay, Wis. The epoxy or similar polymer coating may then be allowed to cure in a conventional manner thus providing a protective coating which has an improved adhesion to the surface which it is designed to protect.

As mentioned previously, the method of the invention for improving the adhesion of polymer coatings to steel surfaces is particularly applicable to coating pipelines in situ. Referring to FIG. 1, there is shown a schematic diagram of a system 10 for carrying out the method of the invention, which system is also used to prepare a pipeline for receiving the coupling agent and the protective coating itself. FIG. 1 illustrates a section of fluid transmission pipeline 11 which is adapted to be connected to a pig launching station 12 and a pig receiving station 14, both of conventional design. The pig launching station 12 comprises an elongated section of pipe 16 of the same diameter as the pipeline 11 and a pig launcher 18 having a removable closure flange 20 disposed over the distal end thereof. In like manner, the pig receiving station 14 comprises an elongated section of pipe 22 and a somewhat enlarged diameter pig receiver 24 having a removable closure flange 26 secured thereto. The pipe sections 16 and 22 may comprise part of the pipeline 11. A source of pressure air, not shown, may be connected to the pig launcher 18 by way of a suitable conduit 30 and a control valve 32. Pressure air may also be communicated to or from the pig receiving station 14 by way of a conduit 34 and a suitable control valve 36.

FIG. 1 also illustrates suitable vessels 40 and 42 which are adapted to contain quantities of coupling agent of the type described above and a suitable polymer coating material, also of a type described above, respectively. The vessels or tanks 40 and 42 are operable to be placed in fluid flow communication with an interior space 15 in the pig launching station 12 by way of a suitable conduit 44 and a control valve 46. The conduit 44 is operable to convey a quantity of either the coupling agent or the polymer coating into the space 15 to be substantially contained between spaced apart pipeline pigs 48 and 50. The pigs 48 and 50 may be of a type having plural circular flanges or wipers 49 and 51, respectively and trailing end piston portions 53 and 55, respectively. The flanges 49 and 51 and the piston portions 53 and 55 may be made of a suitable resilient material so that they are at least somewhat deformable. The pig 48 may be dimensioned to be a tighter fit in the pipeline 10 than the pig 50 so that the pig 50 will leave a film 17 of coupling agent on the surfaces of the pipe as well as a film of coating material of suitable thickness.

In preparation for coating the interior of the pipeline 11 with an organosilane coupling agent, the pipeline is prepared for this process by displacing the pipeline product from the line with water or other suitable displacement fluid. The pipeline 11 is then, normally, pressure tested for leakage and if none is found suitable pigs are conveyed through the line to remove solids from the interior of the line together with any corrosion materials which are adhered to the pipeline interior walls 13.

After removal of solids from the pipeline 11, several flushing steps may be required, depending on whether or not the pipeline still contains certain hydrocarbons, such as paraffins or other hydrocarbon components. The inside wall 13 of the pipeline 11 may then be treated in accordance with the procedure described above for preparing a steel surface for receipt of the coupling agent and the polymer coating in accordance with the invention. Namely, the pipeline 11 is flushed with a cleaning agent comprising a suitable concentration of hydrochloric acid followed by flushing with fresh water. The solids content of the fresh water flush is measured and, if below a certain percent by volume, and, if all of the hydrochloric acid has been removed, the wall surface 13 is then treated with a passivating agent, such as phosphoric acid, followed by flushing with fresh water and a suitable wet blast inhibitor, as previously described. After determining if all of the acid materials have been removed from the interior of the pipeline 11 (pH should be greater than about six), the line is then flushed with a methanol-MEK solution. A wiper pig, not shown, is then typically run through the pipeline 11 and the materials pushed ahead of the pig are analyzed for hydrocarbons.

After completion of the cleaning process, pressure air is flowed through the pipeline 11 to dry the interior wall surface 13. Sufficient drying is verified by checking the dew point of air being vented from the receiving station 14 through a suitable control valve 60 and conduit 62 which may be connected to a suitable receiving tank 64. Certain conduits and control valves connected to the respective pig launching and receiving stations 12 and 14, and used for conveying fluids to and from the pipeline 11 in the cleaning process have been omitted from FIG. 1 and are part of a conventional system used for cleaning pipelines in preparation for receiving internal coatings therein.

When the interior of the pipeline 11 is sufficiently dry, a quantity of an organosilane coupling agent 70 of the type described hereinabove may be placed in the conduit 16 of the launching station 12 between the spaced apart pigs 48 and 50. After a suitable predetermined quantity of coupling agent 70, in an alcohol or alcohol water solution, has been loaded into the space 15, valve 46 is closed, the pigs 48 and 50 are launched through the pipeline 11 by conveying pressure air into the pig launcher 18 through the conduit 30 and control valve 32. As the slug of coupling agent 70 is conveyed through the pipeline 11 between the pigs 48 and 50, a film 17 of coupling agent is deposited on the interior wall surface 13 of the line. Any fluid in the pipeline ahead of the pig 48 may be suitably vented through the conduit 62 into the tank 64 or another suitable receiving tank, not shown. If the pipeline 11 is substantially full of clean, dry air ahead of the pig 48 it may simply be vented to atmosphere through the conduit 62 and control valve 60.

When the pig 48 reaches the pig receiver 24 the control valve 60 may be Operated to vent any remaining coupling agent trapped between the pigs 48 and 50 into the tank 64 as the pig 50 is conveyed into the receiver 24, also under the urging of pressure air. The foregoing procedure has resulted in the application of a superior coupling agent to the wall surface 13 for improving the adhesion of polymer coatings to the surface.

After allowing the coupling agent 70 to dry on the wall surface 13, if the moisture content of the air in the pipeline is suitable for application of the polymer coating, a set of pigs similar to the pigs 48 and 50 is positioned in the launching station 12 to provide a suitable space 15 for loading a slug of polymer coating containing a catalyst into the space from the tank 42. After the control valve 46 is closed the pigs 48 and 50 are launched by pressure air acting on the pig 50 while suitable control is maintained at the receiving station 14 by venting pressure air through the valve 60 or 36 to control the speed of the slug of coating material and the leading and trailing pigs. When the train of pigs and remaining coating material, if any, have reached the receiving station 14 and calculations of the volume of coating material remaining between the pigs determine that a suitable coating layer has been applied to the pipeline 10, the coating is then allowed to cure for a predetermined period of time. This last mentioned step may include flowing dry air through the pipeline 11 to facilitate the curing process.

Although preferred methods of improving adhesion of polymer coatings to steel surfaces have been described in detail hereinabove including, in particular, an improved method of coating the interior surfaces of steel pipelines, those skilled in the art will recognize that various substitutions and modifications may be made to the invention without departing from the scope and spirit of the appended claims.

What is claimed is:

1. A method for applying a protective coating to a steel surface to minimize corrosion of said surface comprising the steps of:

cleaning a steel surface to remove at least one of corrosion particles and hydrocarbons from said surface and providing said surface with a roughness of at least 0.50 mils;

applying a film of coupling agent to said surface said coupling agent comprising an organosilane having at least two functionalities, one of said functionalities providing a bond between said surface and silicon in said organosilane, the other functionality comprising a non-hydrolyzable organic radical providing a bond with a polymeric coating;

and applying said polymeric coating to said surface over said film, said polymeric coating being selected from a group consisting of epoxies, polyamines, polyamides and vinyl esters.

2. The method set forth in claim 1 wherein:

the step of applying said coupling agent includes depositing said coupling agent in a solution of a carrier fluid on said surface; and drying said surface to substantially remove said carrier fluid.

3. The method set forth in claim 2 including the step of:

providing said carrier fluid as one of water, alcohol, toluene, tetrahydrofuran and a hydrocarbon fluid.

4. The method set forth in claim 1 including the step of:

providing said coupling agent having a hydrolyzable group consisting of one of an alkoxy, acyloxy, amine and chlorine.

5. The method set forth in claim 1 including the step of:

providing said coupling agent selected from a group consisting of 3-Aminopropyl-triethoxysilane and Glycidoxypropyltrimethoxysilane.

6. The method set forth in claim 1 wherein:

said surface comprises an interior wall of a steel pipeline and the step of applying said coupling agent to said surface is carried out by traversing a slug of a solution containing said coupling agent through said pipeline to deposit said coupling agent on said surface.

7. The method set forth in claim 6 including the step of:

pumping air through said pipeline after deposition of said coupling agent on said surface to cure said coupling agent.

8. The method set forth in claim 7 wherein:

the step of applying said polymer coating comprises traversing a slug of said polymer coating through said pipeline to deposit a layer of said polymer coating on said coupling agent.

9. The method set forth in claim 1 including the step of:

cleaning said surface with hydrochloric acid prior to applying said coupling agent to said surface.

10. The method set forth in claim 9 including the step of:

flushing said surface to provide a surface having a pH greater than about six.

11. A method for applying a protective coating to the interior of a steel pipeline, in situ, comprising the step of:

cleaning the interior of a steel pipeline to remove at least one of solid and fluid contaminants from an inside wall surface of said pipeline and providing said wall surface with a roughness of at least 0.05 mils;

providing a quality of a coupling agent for adhering a polymeric coating to said wall surface, said coupling agent comprising an organosilane having at least two functionalities, one of said functionalities providing a bond between said surface and silicone in said organosilane, the other functionality comprising a non-hydrolyzable organic radical providing a bond with a polymeric coating;

displacing a slug of said coupling agent through said pipeline to deposit a film of said coupling agent in said wall surface; and applying a polymeric coating to said film, said polymeric coating selected from a group consisting of epoxies, polymines, polymides and vinyl esters to minimize corrosion of said pipeline.

12. The method set forth in claim 11 including the step of:

providing said coupling agent having a hydrolyzable group consisting of one of an alkoxy, acyloxy, amine and chlorine.

13. The method set forth in claim 11 including the step of:

providing said coupling agent selected from a group consisting of 3-Aminopropyl-triethoxysilane and Glycidoxypropyltrimethoxysilane.

14. A method for preparing the surface of a carbon steel article for application of a protective coating, comprising the steps of:

cleaning a surface of a carbon steel article to remove at least one of corrosion products and contaminants from said surface and providing said surface with a roughness of at least b 0.50mils;

providing a quantity of a coupling agent for adhering a polymer coating to said surface, said coupling agent comprising an organosilane having at least two functionalities, one of said functionalities comprising a hydrolyzable group providing a bond between said surface and silicon in said organosilane, the other functionality comprising a non-hydrolyzable organic radical capable of providing a bond with a polymer coating selected from a group consisting of epoxies, polyamines, polyamides, and vinyl esters;

applying said coupling agent to said surface in a solution of one of water, alcohol and a hydrocarbon fluid;

drying said coupling agent on said surface; and applying a polymer coating to said coupling agent, said polymer coating selected from a group consisting of epoxies, polyamines, polyamides and vinyl esters.

15. The method set forth in claim 14 including the step of:

providing said coupling agent having a hydrolyzable group consisting of one of an alkoxy, acyloxy, amine and chlorine.

16. The method set forth in claim 14 including the step of:

cleaning said surface with hydrochloric acid prior to applying said coupling agent to said surface.

17. The method set forth in claim 16 including the step of:

treating said surface with phosphoric acid after treating said surface with hydrochloric acid.

18. The method set forth in claim 17 including the step of:

flushing said surface to provide a surface having a pH greater than about six.

* * * * *